US012210606B1

(12) United States Patent
Rodriguez et al.

(10) Patent No.: US 12,210,606 B1
(45) Date of Patent: Jan. 28, 2025

(54) METHODS AND SYSTEMS FOR ENHANCING THE DETECTION OF SYNTHETIC SPEECH

(71) Applicant: Daon Technology, Douglas (IM)

(72) Inventors: Raphael A Rodriguez, Marco Island, FL (US); Olena Mizynchuk, Marco Island, FL (US); Davyd Mizynchuk, Kyiv (UA)

(73) Assignee: Daon Technology, Douglas (IM)

( * ) Notice: Subject to any disclaimer, the term of this patent is extended or adjusted under 35 U.S.C. 154(b) by 0 days.

(21) Appl. No.: 18/629,085

(22) Filed: Apr. 8, 2024

(51) Int. Cl.
| | |
|---|---|
| *G06F 21/32* | (2013.01) |
| *G06Q 20/40* | (2012.01) |
| *G10L 15/22* | (2006.01) |
| *G10L 17/02* | (2013.01) |
| *G10L 17/04* | (2013.01) |
| *G10L 17/06* | (2013.01) |
| *G10L 17/26* | (2013.01) |
| *H04N 21/4415* | (2011.01) |

(52) U.S. Cl.
CPC .............. *G06F 21/32* (2013.01); *G10L 17/02* (2013.01); *G10L 17/04* (2013.01); *G10L 17/06* (2013.01); *G10L 17/26* (2013.01); *H04N 21/4415* (2013.01); *G06Q 20/40* (2013.01); *G10L 15/22* (2013.01)

(58) Field of Classification Search
CPC ......... G06F 21/32; G10L 17/02; G10L 17/04; G10L 17/06; G10L 17/26; G10L 15/22; G06Q 20/40; H04N 21/4415
See application file for complete search history.

(56) References Cited

U.S. PATENT DOCUMENTS

| | | | |
|---|---|---|---|
| 9,865,253 B1* | 1/2018 | De Leon | G10L 25/90 |
| 10,943,604 B1* | 3/2021 | Bone | G10L 17/04 |
| 11,955,122 B1* | 4/2024 | Ahmadi | G10L 15/18 |
| 2017/0084295 A1* | 3/2017 | Tsiartas | G10L 17/08 |
| 2020/0321009 A1* | 10/2020 | Khoury | G10L 17/18 |
| 2021/0193174 A1* | 6/2021 | Enzinger | G10L 17/00 |
| 2022/0036904 A1* | 2/2022 | Traynor | G10L 25/51 |

(Continued)

OTHER PUBLICATIONS

Mireia F. Cabeceran, Fusing Prosodic and Acoustic Information for Speaker Recognition, PhD Dissertation, TALP Research Center, Barcelona (Year: 2008).*

(Continued)

*Primary Examiner* — Shanto Abedin
(74) *Attorney, Agent, or Firm* — Kevin McDermott, Esq.

(57) ABSTRACT

A method for enhancing detection of synthetic speech is provided that includes the step of receiving, by an electronic device, voice biometric data of a user captured while the user was speaking and analyzing the context in which the received voice biometric data was captured. The context includes environmental and situational factors. Moreover, the method includes the steps of analyzing characteristics of the received voice biometric data for anomalies associated with synthetic speech, generating a risk score based on the results of the analysis, and comparing the risk score against a threshold value. In response to determining the risk score fails to satisfy the threshold score, the method includes a step of determining the captured voice biometric data includes anomalies associated with synthetic speech and initiating an alert protocol.

17 Claims, 4 Drawing Sheets

(56) References Cited

U.S. PATENT DOCUMENTS

2022/0328050 A1* 10/2022 Hennig .................. G10L 17/24
2023/0107624 A1*  4/2023 Keith, Jr. ................ G06F 21/32
                                                        704/249
2023/0411008 A1* 12/2023 Khanzada .............. G16H 10/65

OTHER PUBLICATIONS

B. Yegnanarayana, Combining Evidence from Source Suprasegmental and Spectral Features for a Fixed-Text Speaker Verification System, IEEE (Year: 2005).*

* cited by examiner

48 ↘

| 50  RISK SCORE | 52  RISK LEVEL |
|---|---|
| 0.00 to 0.33 | LOW |
| 0.34 to 0.66 | MEDIUM |
| 0.67 to 1.00 | HIGH |

| 52  RISK LEVEL | 56  ALERT |
|---|---|
| LOW | NO IMMEDIATE ACTION |
| MEDIUM | AUTOMATED REVIEW OR LOW PRIORITY MANUAL REVIEW |
| HIGH | HIGH PRIORITY |

FIG. 5

METHODS AND SYSTEMS FOR ENHANCING THE DETECTION OF SYNTHETIC SPEECH

BACKGROUND OF THE INVENTION

This invention relates generally to synthetic speech, and more particularly, to methods and systems for enhancing detection of synthetic speech.

The development of artificial intelligence (AI) and machine learning (ML) technologies has enabled the development of synthetic speech technologies capable of generating synthetic speech that can be difficult to distinguish from genuine human speech. Such synthetic speech may mimic the intonation, rhythm, and emotional nuances of genuine human speech. As a result, synthetic speech may be a threat to security systems that use voice data to authenticate or verify the identities of people. Specifically, synthetic speech may increase the risks of successfully perpetuating identity fraud on people and institutions, increase the risk of unauthorized access to confidential information stored on computer systems as well as the computer systems themselves, and increase the risks that misinformation campaigns will be successful amongst other things.

Known security systems, including conventional voice watchlist systems, are generally designed to detect known security threats based on historical data or predefined criteria. However, such security systems have been known to fail to identify synthetic speech, particularly synthetic speech designed to emulate specific emotional or behavioral patterns exhibited by people. Known security systems generally analyze voice data in isolation without considering nuances such as the underlying emotional context or subtle variances that may indicate speech may be synthetic. Consequently, there is a need for more advanced detection mechanisms that can detect such nuances and adapt to the evolving sophistication of synthetic speech technologies.

Thus, it would be advantageous and an improvement over the relevant technology to provide a method and a system capable of considering the underlying emotional context and detecting the subtle variances in voice data while adapting to the constantly evolving synthetic voice technologies.

BRIEF DESCRIPTION OF THE INVENTION

An aspect of the present disclosure provides a method for enhancing detection of synthetic speech that includes the step of receiving, by an electronic device, voice biometric data of a user captured while the user was speaking and analyzing the context in which the received voice biometric data was captured. The context includes environmental and situational factors. Moreover, the method includes the steps of analyzing characteristics of the received voice biometric data for anomalies associated with synthetic speech, generating a risk score based on the results of the analysis, and comparing the risk score against a threshold value. In response to determining the risk score fails to satisfy the threshold score, the method includes a step of determining the captured voice biometric data includes anomalies associated with synthetic speech and initiating an alert protocol.

In an embodiment of the present disclosure, the alert protocol includes manually reviewing the received voice biometric data, and categorizing the received voice biometric data as potentially synthetic speech based on the risk score.

In another embodiment of the present disclosure, the characteristics include range of pitch, timbre, intensity, prosody, and the pace, rhythm, and nature of speech.

In yet another embodiment of the present disclosure, the anomalies include a narrow range of pitch; a lack of expected complexity, unusual harmonic structures, and erratic formant movements; variations in loudness not corresponding with an expressed or expected emotion; consistent speech rate; abnormal pauses; inconsistencies in stress patterns; intonation curves unusual for the context; hesitations or rushed speech; lack of natural pitch variation across sentences; an unexpected pitch contour within a phrase; unusually long or short durations; and lack of variability in durations.

In another embodiment of the present disclosure the method includes analyzing the frequency range of the received voice biometric data to detect frequency patterns indicative of synthetic or genuine generation, and comparing the detected frequency patterns against genuine voice frequency pattern benchmarks and synthetic voice frequency pattern limitations.

In another embodiment of the present disclosure the method includes determining the minimum and maximum frequency values to establish a frequency spectrum, and evaluating variations within the frequency spectrum to distinguish genuine from synthetic speech.

In another embodiment of the present disclosure, the method includes assessing the distribution and intensity of frequencies across the received voice biometric data, creating a spectral profile from the received voice biometric data, and detecting anomalies in the spectral profile associated with synthetic speech.

In another embodiment of the present disclosure, the analyzing the frequency range step includes operating, by the electronic device, a machine learning model trained to recognize and differentiate between synthetic and genuine speech.

In another embodiment of the present disclosure, the method includes updating the machine learning model using data from authentication transactions to enhance the accuracy of the model in recognizing and differentiating between synthetic and genuine speech.

Yet another aspect of the present disclosure provides a non-transitory computer-readable recording medium in an electronic device for enhancing detection of synthetic speech.

Yet another aspect of the present disclosure provides an electronic device for enhancing detection of synthetic speech including a processor and a memory configured to store data. The electronic device is associated with a network and the memory is in communication with the processor and has instructions stored thereon which, when read and executed by the processor, cause the electronic device to receive voice biometric data of a user captured while the user was speaking and analyze the context in which the received voice biometric data was captured. The context includes environmental and situational factors. Moreover, the instructions stored thereon which, when read and executed by the processor, cause the electronic device to analyze characteristics of the received voice biometric data for anomalies associated with synthetic speech, generate a risk score based on the results of the analyzing characteristics step, and compare the risk score against a threshold value. In response to determining the risk score fails to satisfy the threshold score, the instructions stored thereon which, when read and executed by the processor, cause the electronic device to determine the received voice biometric data includes anomalies associated with synthetic speech and initiating an alert protocol.

In an embodiment of the present disclosure, wherein the instructions when read and executed by the processor, further cause the electronic device to prompt a manual review of the received voice biometric data, and categorize the received voice biometric data as potentially synthetic based on the risk score.

In another embodiment of the present disclosure, the characteristics include range of pitch, timbre, intensity, prosody, and the pace, rhythm, and nature of speech.

In another embodiment of the present disclosure, the anomalies include: a narrow range of pitch; a lack of expected complexity, unusual harmonic structures, and erratic formant movements; variations in loudness not corresponding with an expressed or expected emotion; consistent speech rate; abnormal pauses; inconsistencies in stress patterns; intonation curves unusual for the context; hesitations or rushed speech; lack of natural pitch variation across sentences; an unexpected pitch contour within a phrase; unusually long or short durations; and lack of variability in durations.

In another embodiment of the present disclosure, wherein the instructions when read and executed by the processor, cause the electronic device to analyze the frequency range of the received voice biometric data to detect frequency patterns indicative of synthetic or genuine generation, and compare the detected frequency patterns against genuine voice frequency pattern benchmarks and synthetic voice frequency pattern limitations.

In yet another embodiment of the present disclosure, wherein the instructions when read and executed by the processor, cause the electronic device to determine the minimum and maximum frequency values to establish a frequency spectrum and evaluate variations within the frequency spectrum to distinguish genuine from synthetic speech.

In yet another embodiment of the present disclosure, wherein the instructions when read and executed by the processor, cause the electronic device to assess the distribution and intensity of frequencies across the received voice biometric data, create a spectral profile from the received voice biometric data, and detect anomalies in the spectral profile associated with synthetic speech.

In yet another embodiment of the present disclosure, wherein the instructions when read and executed by the processor, cause the electronic device to operate a machine learning model trained to recognize and differentiate between synthetic and genuine speech.

In yet another embodiment of the present disclosure, wherein the instructions when read and executed by the processor, cause the electronic device to update the machine learning model using data from authentication transactions to enhance the accuracy of the model in recognizing and differentiating between synthetic and genuine speech.

In an embodiment of the present disclosure, the instructions when read and executed by the processor, further cause the electronic device to determine a risk level for the risk score and determine the alert for the risk level.

BRIEF DESCRIPTION OF THE DRAWINGS

FIG. 4 is a diagram illustrating example risk scores and corresponding risk levels;

FIG. 5 is a diagram illustrating the example risk levels as shown in FIG. 4 and corresponding example alerts.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
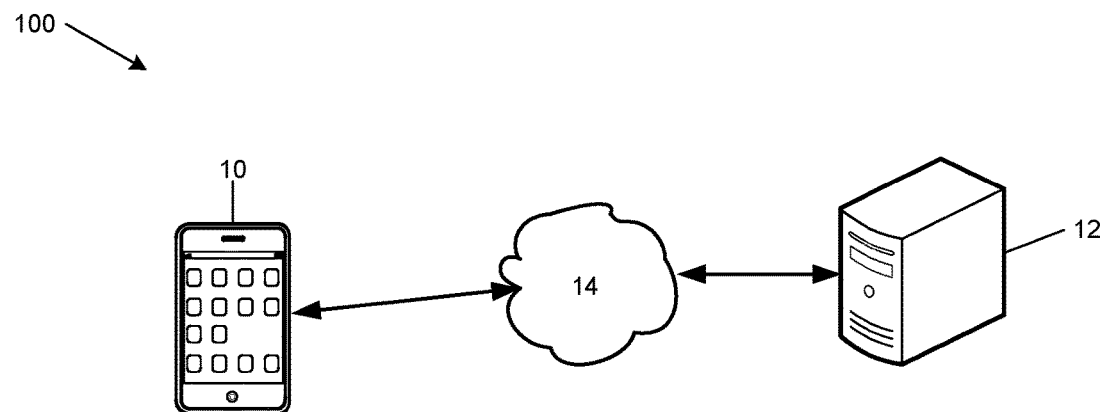
FIG. 1 is a schematic diagram of an example computing system for enhancing detection of synthetic speech according to an embodiment of the present disclosure.

FIG. 1 is a schematic diagram of an example computing system 100 for enhancing detection of synthetic speech provided, for example, during a remotely conducted authentication transaction according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. Moreover, the electronic device 10 may alternatively be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 may be associated with a single person who operates the device. The person who is associated with and operates the electronic device 10 may be referred to herein as a user. Additionally, a user may be any person being authenticated, for example, during an authentication transaction.

The server 12 can be, for example, any type of server or computer implemented as a network server or network computer. The electronic device 10 and server 12 may alternatively be referred to as information systems. The server 12 may also alternatively be referred to as an electronic device.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
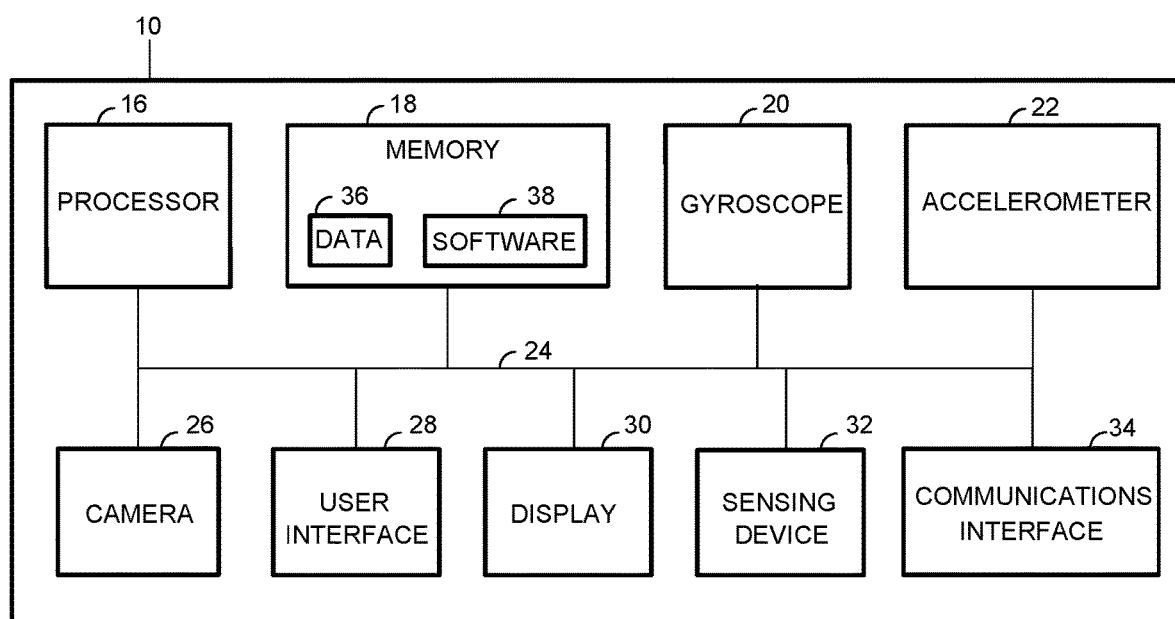
FIG. 2 is a more detailed schematic diagram illustrating an example electronic device in the system of FIG. 1.

FIG. 2 is a more detailed schematic diagram illustrating the example electronic device 10 used for enhancing detection of synthetic speech provided, for example, during a remotely conducted authentication transaction according to an embodiment of the present disclosure. The electronic device 10 includes components such as, but not limited to, one or more processors 16, a memory 18, a gyroscope 20, one or more accelerometers 22, a bus 24, a camera 26, a user interface 28, a display 30, a sensing device 32 and a communications interface 34. General communication between the components in the electronic device 10 is provided via the bus 24.

In FIG. 2, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that capable of communicating with the electronic device 10. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC). It is contemplated by the present disclosure that the electronic device 10 may not include some components, for example, the gyroscope 20 and accelerometer 22 in some embodiments.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 36, for example, data records of users. Each data record is typically for a respective user. The data record for each user may include data such as, but not limited to, data captured during authentication transactions, biometric templates, personal data, and authentication transaction results. Data captured during authentication transactions may include, but is not limited to, biometric modality data and data regarding the context in which the biometric modality data was captured. Voice biometric data for each user may be analyzed to determine typical speech patterns for the respective user and for training machine learning models.

A biometric template can be any type of mathematical representation of biometric modality data. Biometric modality data is the data of a biometric modality of a person. For the methods and systems described herein, the biometric modality is voice.

The memory 18 may be considered a database. It is contemplated by the present disclosure that the database may alternatively be implemented as a decentralized database employing blockchain technology. Such an alternative implementation would store the same data as described herein for the memory 18.

Voice biometric data may be captured by the electronic device 10 by recording a user speaking a phrase. The phrase may be secret. Captured voice biometric data may be temporarily or permanently stored in the electronic device 10 or in any device capable of communicating with the electronic device 10 via the network 14. Voice biometric data is captured as audio data. Audio signals are audio data. The audio data is stored as an audio data file. As used herein, capture means to record temporarily or permanently, any data including, for example, voice biometric data of a person while speaking. Stored captured voice biometric data and stored biometric templates may be referred to as record voice biometric data. Voice biometric data may alternatively be referred to herein as speech. Similarly, speech may alternatively be referred to herein as voice biometric data.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 18 can be used to store any type of software 38. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, authentication applications, machine learning algorithms (MLA), trained machine learning models, and any other software and/or any type of instructions associated with algorithms, processes, or operations for controlling the general functions and operations of the electronic device 10. The software may also include computer programs that implement buffers and use RAM to store temporary data.

Authentication applications enable the electronic device 10 to conduct user verification and identification (1:N) transactions with any type of authentication data, where "N" is a number of candidates.

A machine learning algorithm (MLA) may be trained to create a machine learning model for enhancing prediction of potential security threats that may be present during authentication transactions, analyzing voice biometric data for characteristics typical of synthetic speech, various speech characteristics of captured voice biometric data, and generating a risk score for each authentication transaction. Machine learning models have parameters which are modified during training to optimize functionality of the models trained using a machine learning algorithm (MLA). The machine learning model may be retrained using data captured during authentication transactions. MLAs include at least classifiers and regressors. Example classifiers are Deep Neural Networks (DNNs), Time Delay Neural Networks (TDNNs), Recurrent Neural Networks (RNNs), Residual Networks (ResNets), Generative Adversarial Networks (GANs).

The process of verifying the identity of a user is known as a verification transaction. Typically, during a verification transaction based on voice biometric data, a verification template is generated from a spoken identification verification phrase captured during the transaction. The verification template is compared against a corresponding recorded enrolment template of the user and a score is calculated for the comparison. The recorded enrolment template is created during enrolment of the user in an authentication system. If the calculated score is at least equal to a threshold value, the identity of the user is verified as true. Alternatively, the captured voice biometric data may be compared against the corresponding record voice biometric data to verify the identity of the user.

The gyroscope 20 and the one or more accelerometers 22 generate data regarding rotation and translation of the electronic device 10 that may be communicated to the processor 16 and the memory 18 via the bus 24. The gyroscope 20 and accelerometer 22 are typically included in electronic devices 10 that are primarily mobile, for example, smart phones and other smart devices, but not in electronic devices 10 that are primarily stationary, for example, servers or personal computers. Thus, the electronic device 10 may alternatively not include the gyroscope 20 or the accelerometer 22 or may not include either.

The camera 26 captures image data. The camera 26 may be integrated into the electronic device 10 as one or more front-facing cameras and/or one or more rear facing cameras that each incorporates a sensor, for example and without limitation, a CCD or CMOS sensor.

The user interface 28 and the display 30 allow interaction between a user and the electronic device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a camera, a keyboard, a mouse, an illuminator, a signal emitter, at least one microphone, for example, dual microphones, and/or speakers. The microphone may be used to capture voice biometric data of a user while speaking during, for example, an authentication transaction.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed, or user entered information can be captured and stored in the memory 18.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet.TM. or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across the network 14 between the electronic device 10 and any other device (not shown). The exchange of information may involve the transmission of radio frequency (RF) signals through an antenna (not shown). Moreover, the exchange of information may be between the electronic device 10, the server 12, the computer 14, other electronic devices (not shown), and other computer systems (not shown) capable of communicating over the network 16.

Examples of other computer systems (not shown) include computer systems of service providers such as, but not limited to, financial institutions, medical facilities, national security agencies, merchants, and authenticators. The electronic devices (not shown) may be associated with any user or with any type of entity including, but not limited to, commercial and non-commercial entities.

The server 12 includes most of the same components as described herein for the electronic device 10. However, because the server 12 is primarily stationary, not primarily mobile, the server 12 may not include the gyroscope 20 and/or the accelerometer 22.

Sentiment analysis may be used in text analysis to gauge opinions, emotions, or attitudes of people. By analyzing the sentiment expressed in voice communications, sentiment analysis techniques may make it possible to detect inconsistencies or anomalies that may suggest a voice is not genuinely human. However, applying sentiment analysis to voice biometric data, or speech, is difficult. These difficulties may be overcome by modifying sentiment analysis techniques using trained machine learning models capable of processing complex audio signals and interpreting a wide range of emotional expressions.

A machine learning model may be trained to detect anomalies and recognize patterns in voice biometric data that may indicate the voice biometric data is synthetic speech or was manipulated using synthetic speech technology. More specifically, the machine learning model may be trained to assess characteristics of speech such as, but not limited to, the range of pitch, intensity or loudness, timbre, resonators, voice coloring, prosody, and the pace, rhythm and nature of speech. These characteristics capture the nuanced variations in sound that may convey emotional states often lacking or inconsistently replicated in synthetic speech or synthetically manipulated speech. Thus, a machine learning model may be trained to correlate these characteristics of voice biometric data with corresponding emotional states to facilitate distinguishing between genuine and synthetic speech. The machine learning model may also be trained to assess frequency bands characteristic of genuine and synthetic speech that facilitate distinguishing between them.

The machine learning model may be trained using data such as, but not limited to, voice biometric data captured, for example, during authentication transactions.

Pitch is the quality of speech that makes it possible to judge sounds as higher and lower. Human voices can vary pitch smoothly and across a wide range within a single utterance. Pitch varied over the duration of an utterance can be referred to as a pitch pattern. Such variations in pitch may indicate different emotions. For example, speech generated while a person is excited may have higher pitch and greater variation, while speech generated when a person is sad may have a lower, monotonous pitch. Such pitch patterns may be associated with corresponding emotional states.

The range of pitch refers to the typical extent of pitch variation an untrained human voice can produce during normal speech or emotional expression. The range of pitch for genuine speech is typically greater than the range for synthetic speech. Genuine speech typically includes a broad range of pitches while synthetic speech typically includes a narrower range of pitches.

Natural genuine human voice has a range of pitch that can span approximately 1.5 to 2 octaves on average in casual speech but can extend further in trained individuals such as singers. For example, a typical male voice might range from about 85 Hz to 155 Hz, considered to be low and high pitches, respectively, in normal speech. However, the higher pitches of male voices may be greater than 155 Hz, for example, 180 Hz and higher. A typical female voice might range from about 165 Hz to 255 Hz in normal speech. However, the higher pitches of an alto or a soprano may be greater than 255 Hz, for example, 200 Hz to 350 Hz depending on the speaker's vocal characteristics and context of the speech, particularly in animated or emphatic speech.

Synthetic speech typically includes a range of pitches narrower than genuine speech. This difference in pitch ranges or a lack of expected pitch variation may be considered an anomaly that may be used to facilitate distinguishing between genuine and synthetic speech. More specifically, the range of pitch in voice biometric data generated during a certain emotional situation may be compared against the expected range of pitch for the certain situation. For example, the speech of a football fan after his or her team wins the Super Bowl is expected to include a broad range of pitches. Speech for such a situation that has a narrow pitch range does not correlate with the expectation. This noncorrelation may be an anomaly that may be used to indicate the speech is synthetic.

Certain vocal exercises such as expressive recitation or singing may be used to exploit the natural range and pitch diversity inherent in human speech, thereby facilitating the detection of synthetic speech. Vocal exercises might include having a subject perform a scale, recite a poem with varying emotional emphasis, or sing a song. These exercises exhibit the pitch modulation capabilities inherent to human speech, with specific notes or phrases highlighted at different pitches. An analysis of speech generated as a result of these exercises might detail how an authentic voice modulates pitch when expressing questions versus statements or how excitement is portrayed through higher pitches and broader pitch excursions. Expressing a question may be evidenced by a rising intonation in speech while a falling or steady intonation may be evidence of expressing a statement.

Intensity or loudness fluctuations in speech may express emphasis, urgency or some type of emotion. For example, a sudden increase in volume might indicate anger or excitement, whereas a softer tone may imply sadness or secrecy. The identification of nuanced emotional expressions including, but not limited to, soft speech, crying, and exclamations of joy, can be used to distinguish genuine from synthetic speech. The intensity of speech can be analyzed to determine whether the speech is modulated in a manner consistent with an expressed or expected emotion. Speech that exhibits variations in loudness that do not correspond to an expressed or expected emotion natural speech dynamics or emotional expressiveness may be synthetic or otherwise fraudulent. Such non-corresponding loudness variations may be considered an anomaly that can be used to distinguish between authentic and synthetic speech.

The timbre or quality of speech is marked by a complex blend of vibrations and overtones. Speech may be characterized as breathy, harsh, or nasal depending on the emotional state of the speaker. Different timbres and corresponding emotional states can be defined and used to facilitate detecting synthetic speech. The timbral characteristics of captured voice biometric data can be analyzed to detect emotional nuances. If the detected emotional nuances correspond to the expected emotional nuances the captured voice biometric data may be authentic. If the detected emotional nuances do not correspond to the expected emotional nuances, the non-correspondence may be evidence that the speech is synthetic. As a result, non-correspondence of detected emotional nuances may be considered to be an anomaly that can be used to distinguish between authentic and synthetic speech.

The authenticity of voice biometric data may be determined using indicators based on timbre including, but not limited to, consistency with human timbral characteristics, comparison against thresholds, anomaly detection, and formant analysis.

Consistency with human timbral characteristics involves determining whether voice biometric data includes a rich, dynamic spectrum of harmonics and smooth formant transitions typical of human voices. A score may be calculated for each timbral characteristic that represents the characteristic in voice biometric data. The score may be compared against a threshold value. Satisfying the threshold value typically indicates that there is a match or close correlation between the voice biometric data and what is expected in authentic speech. Failing to satisfy the threshold score may be evidence that the voice biometric data includes anomalies, which may facilitate determining the voice biometric data is synthetic. Anomalies can be abnormal timbral features included in speech, for example, a lack of expected complexity, unusual harmonic structures, or erratic formant movements. Formants are resonant frequencies of the vocal tract that shape the voice's timbre. Formant patterns can be analyzed by noting the variability and transitions that occur naturally in human speech as opposed to the more static or inconsistent formant patterns in synthetic speech.

Concluding that voice biometric data includes typically human timbral characteristics is evidence that facilitates supporting a decision that the voice biometric data is authentic. Otherwise, the voice biometric data may be synthetic.

Each person has a unique voice which can be defined by a combination of timbral characteristics distinct to each person. Each person's voice is shaped by the unique anatomical structures of his or her vocal apparatus, which produces uniquely identifiable timbral qualities. The timbral changes that accompany different emotional states, for example, happiness, sadness and anger, can be part of a person's voice, as these modulations are influenced by individual expressiveness and physiological responses. The way a person articulates speech sounds, for example, crispness, clarity, and rate of speech also contributes to his or her unique voice. For example, a person might consistently produce brighter vowels or darker consonants.

Timbre analysis employs advanced acoustic metrics to capture the nuanced and dynamic nature of human vocal timbre. More specifically, timbre may be analyzed using spectral analysis and harmonic-to-noise-ratio (HNR). Spectral Analysis involves breaking down a voice signal into constituent frequencies using techniques such as, but not limited to, Fast Fourier Transform (FFT). The spectral content reveals the rich harmonics and overtones that are characteristic of human voices but are typically simplified or absent in synthetic speech.

Harmonic-to-Noise Ratio (HNR) is a metric that facilitates evaluating the amount of harmonic sound relative to noise in voice biometric data. Harmonic sound is typically periodic whereas noise is typically aperiodic. Human voices have a complex blend of periodic and aperiodic components that change dynamically with expression and emotion, unlike synthetic voices that may have more static or less nuanced HNR profiles.

Voice resonators are anatomical amplifiers unique to each person that impacts speech modulation and richness. Example voice resonators include, but are not limited to, the throat, nasal passages, chest cavity, and oral cavities. The throat can amplify mid-range frequencies which enhances the resonance of speech to create a more intense and focused sound that may convey a sense of urgency or excitement.

The nasal passages of each individual add a distinct coloration to the speech of the individual, especially noticeable in sounds like 'm,' 'n,' and 'ng.' A natural voice may show subtle nasal resonance in normal speech. However, synthetic speech typically includes an exaggerated nasal resonance or no nasal resonance.

The chest cavity enhances lower speech frequencies, giving depth and warmth to speech. Authentic speech might include a resonant, full-bodied quality when speaking from the chest, indicative of genuine emotional expression or particular speech styles.

Oral cavities include the mouth of each individual. The mouth facilitates shaping and filtering sound, thus impacting the articulation and clarity of speech. Speech variations created by the mouth facilitate creating vowel sounds and speech intelligibility. Differences in oral resonance reflect individual articulatory habits or emotional states.

The interplay and mutual influence among various resonators may be analyzed using acoustic analysis, spectrographic analysis, and formant tracking. Acoustic analysis involves recording and analyzing voice biometric data to identify characteristic resonance patterns. The resonance patterns can be compared against expected record resonance pattern data.

Spectrograms can show the distribution of energy across different frequencies over time. Spectrographic analysis involves analyzing a spectrogram to reveal how different resonators contribute to the overall timbre of speech. Human speech displays dynamic and complex spectrographic patterns that are challenging to replicate accurately in synthetic speech.

Prominent resonant frequencies in voice biometric data are known as formants. Formant tracking involves tracking the formants in voice biometric data, which provides insights into how airflow and tissue vibration interact within the vocal tract. Discrepancies in expected formant patterns can indicate anomalies related to synthetic speech.

Techniques for identifying how airflow is directed to resonate within various bodily cavities include, but are not limited to, flow phonation analysis, harmonic analysis, and resonance tuning. Flow phonation analysis examines how smoothly air flows through the vocal tract and is modulated by various resonators. In authentic speech, the flow phonation is dynamic and responsive to expressive intent, while synthetic speech may exhibit less variability and responsiveness.

Harmonic analysis assesses the harmonic structure produced by voice biometric data. Resonators affect the harmonic content and authentic speech to exhibit a rich harmonic structure that changes fluidly with speech dynamics.

Resonance tuning refers to the adjustment of resonator shape and size, as observed in real-time speech production. Techniques such as magnetic resonance imaging (MRI) or real-time spectrographic feedback during phonation can provide information about resonance tuning. Experienced speakers or singers have been known to skillfully tune his or her resonators to enhance expressivity or to project their voice.

The interplay and mutual influence among various resonators may be analyzed to discern the unique voice coloring of a person, an aspect seldom accurately replicated in synthetic speech. Typical resonator usage patterns may be recognized and inked to specific voice qualities such as depth or nasality, to further authenticate speech.

Voice Color includes, for example, depth and warmth, nasality, brightness and clarity. A person who uses chest resonation effectively can speak with depth and warmth, which is often associated with sincerity or calmness. For example, a parent reading to a child may read or speak with warmth and depth.

Speech that predominantly uses nasal passages can have a noticeable nasal quality. For example, when a person is excited or speaks rapidly the nasal tone might become more pronounced. The more pronounced nasal tone may add a distinct color to the person's speech that can be indicative of his or her emotional state or identity.

The use of oral resonators can lend a voice brightness and clarity, characteristics often perceived in enthusiastic or articulate speech. An actor projecting joy or surprise might exhibit increased brightness in his or her speech tone.

Analyzing voice coloring involves scrutinizing how sound is produced and modulated by different resonators. Such analyses may be conducted, for example, using resonator balancing and voice print analysis. Resonator balancing involves analyzing the balance between using different resonators like the chest, mouth, and head. This balance can be analyzed by assessing the amplitude and frequency distribution in speech, and identifying which resonators are predominantly used in various speaking contexts.

Techniques that can be used to analyze and understand voice coloring include, but are not limited to, spectral decomposition, formant mapping, and timbre analysis. Spectral decomposition involves breaking down speech into its constituent frequencies to analyze the specific contributions of different resonators. Peaks in the spectrum can indicate dominant resonator usage, helping to identify unique voice coloring attributes.

Formant frequencies are resonant frequencies of the vocal tract. Formant mapping involves mapping the formant frequencies which enables deducing which resonators are predominant in speech. Variations in formant patterns can reveal how voice coloring changes with emotion or intent.

Timbre analysis involves assessing the blend of harmonics in speech and identifying characteristics in the speech that contribute to the unique color of the speech.

Using the techniques described herein, subtle nuances in voice coloring of individuals may be detected to thus provide a robust framework for authenticating voice biometric data and detecting synthetic speech.

Genuine human speech exhibits variable pacing. For example, a speaker may speak faster when excited or speak slower to emphasize a point. Moreover, human speech dynamics change with emotional context. For example, a person might speak rapidly and with less clarity when anxious, or their voice might quiver when sad. Excitement might be conveyed with increased pitch and volume, whereas disappointment might lead to a decrease in both. Thus, rapid speech might denote excitement or anxiety, while a slower rate might be used to convey solemnity or sadness.

Authentic conversations include natural pauses, for example, taking a breath or thinking about what to say during the conversation which contrasts with the mechanical delivery found in synthetic speech. Natural pauses may result from a person's unique speech habits or quirks such as a person's characteristic way of laughing, hesitating with "um" or "ah," or altering tone mid-conversation. Another example might be code-switching, where a bilingual speaker subconsciously flips between languages or dialects based on the context.

The pacing and rhythm of speech may be analyzed to identify authentic human speech patterns characterized by variability in speed, pauses, and fluency. How emotional context influences speech dynamics, including reaction to stimuli and the presence of natural speech idiosyncrasies may be considered to effectively distinguish between human and synthetic speech.

A detailed temporal analysis of speech may be conducted that records variations in speed, pauses, and rhythm to establish a record of natural speech dynamics for comparison against speech captured during, for example, an authentication transaction to facilitate detecting synthetic speech.

The emotional context of voice biometric data captured during, for example, an authentication transaction can be analyzed for patterns typically associated with specific emotions. Patterns can include changes in pitch, volume, and speed, which are then correlated with the linguistic and situational context to assess authenticity of the captured speech.

Temporal characteristics of captured voice biometric data may be analyzed to identify patterns of pacing and pausing that align with natural speech norms. Voice biometric data that includes unnatural timing patterns such as a consistent speech rate or abnormal pauses may indicate that speech is synthetic. Thus, unnatural timing patterns such as a consistent speech rate or abnormal pauses may be considered anomalies that can be used to distinguish between authentic and synthetic speech. Moreover, spectral analysis may be used to analyze the frequency components of captured speech to observe how the frequency components change with different emotional states or with speech dynamics to identify authentic human expressiveness.

Natural Language Processing (NLP) techniques can be employed to facilitate understanding the situational context of speech to facilitate interpreting the emotional significance of specific speech dynamics and idiosyncrasies.

Analyzing the pacing of speech as described herein, facilitates distinguishing the nuanced and variable nature of human speech from the more static or predictable speech generated by synthetic speech generators.

Emotional states can affect articulation clarity and pronunciation. Stress, for example, might lead to more clipped or less articulate speech. Articulation patterns in speech may be analyzed to detect inconsistencies of overly uniform pronunciation, which may indicate synthetic speech. Moreover, mismatches between expected emotional tone based on context and the actual emotional tone conveyed by the speech may indicate that the speech is synthetic. Inconsistencies of overly uniform pronunciation and mismatches between expected emotional tone based on context and the actual emotional tone conveyed by the speech may be anomalies that can be used to distinguish between authentic and synthetic speech.

Prosody refers to the rhythm, stress, and intonation of speech, which are integral to conveying emotion. For example, interrogative intonation rises at the end of a sentence. Prosodic aspects of speech may be analyzed to determine whether the emotional expression of speech is coherent and consistent. More specifically, inconsistencies in stress patterns or intonation curves unusual for the context or language norm may indicate that the speech is synthetic or otherwise fraudulent. Thus, inconsistencies in stress patterns or intonation curves unusual for the context or language norm may be anomalies that can be used to distinguish between authentic and synthetic speech.

Rhythm as described herein is the flow and pace of speech. The natural flow and pace of a user's speech can be analyzed to find patterns or irregularities in the speed of speech, which can sometimes indicate stress, uncertainty, or scripting, which are common in spoofing attacks. Unusual pauses or changes in the rhythm of speech, such as hesitations or rushed sequences, might suggest that the speaker is not genuine or is following a premeditated script.

Natural speech involves variations in pitch. The variations in pitch are assessed to determine if they fit the normal speech patterns of the user or if they seem unnatural or monotone, as might be the case with synthetic voices.

Intonation is closely tied to emotional expression. Changes in intonation based on the conversational context facilitates identifying if the voice lacks the emotional depth or variability expected in genuine human speech. A lack of natural pitch variation across sentences or an unexpected pitch contour within a phrase may indicate that speech is synthetic. Thus, a lack of natural pitch variation across sentences or an unexpected pitch contour within a phrase may be anomalies that can be used to distinguish between authentic and synthetic speech.

The time taken by a user to respond to prompts or questions during, for example, an authentication transaction can also be evaluated. An unusually fast response or a consistent delay might indicate a synthetic interaction or a person following a script. Analyzing the duration of spoken phrases can reveal information that may facilitate determining whether data is fraudulent. For example, unusually short or long durations, or a lack of variability in durations, might be characteristic of synthetic speech and thus can constitute anomalies that can be used to distinguish between authentic and synthetic speech.

Sound wave frequency refers to the speed at which sound waves vibrate within a second, defining the pitch of speech. High-pitched sounds have a high frequency, whereas low-pitched sounds have a low frequency. A person singing a high note might reach frequencies around 2,000 Hz, whereas their normal speaking voice might hover around 150-300 Hz for males and 200-400 Hz for females. Although human voices typically are within these ranges, it should be understood that authentic human speech may include frequencies up to 11,000 Hz. During emotional or emphatic speech, the frequency might spike or dip, reflecting the intensity or type of emotion being expressed.

Synthetic speech, particularly synthetic speech generated for deceptive purposes, generally has a high frequency around 5,354 Hz. However, it is contemplated by the present disclosure that synthetic speech may have higher frequencies.

The difference between the higher frequencies of authentic and synthetic speech can be considered an anomaly that can be used to distinguish between authentic and synthetic speech. More specifically, thresholds may be established based on, for example, 1,000 Hz to 11,000 Hz for human speech versus, for example, up to 5,354 Hz or higher for synthetic speech.

The thresholds may be used to detect potential synthetic speech for manual review or immediate classification. For example, speech falling within the range of 6,000 Hz to 11,000 Hz may be deemed authentic, while speech including frequencies at or below the threshold for synthetic speech, for example, 5,354 Hz may be synthetic or authentic. As a result, speech including frequencies at or below the threshold for synthetic speech should be subject to additional review which can include manual review.

The frequency of sound waves is typically analyzed using Fourier transforms, a mathematical technique that decomposes a signal into its constituent frequencies. This analysis would reveal the fundamental frequency and harmonics of speech. The fundamental frequency is the lowest frequency in speech, often perceived as the pitch. The harmonics of speech are multiples of the fundamental frequency that contribute to the timbre of the speech.

Each individual's voice is uniquely characterized by his or her typical frequency ranges. Analyzing these frequency ranges can help identify and authenticate individual voices.

The human voice can vary widely depending on numerous factors like age, gender, health, and emotional state. A tolerance is essential to accommodate this natural variability. A frequency of 1,000 Hz can be used as a central reference for a typical adult speech. However, actual frequencies can vary significantly from 1,000 Hz. Varying frequencies can fall within tolerances or adaptive thresholds of the 1,000 Hz reference that are dynamically adjustable based on the speech's content and context. Such tolerances or adaptive thresholds may be used to facilitate accurately identifying authentic versus synthetic speech across various populations and contexts.

Figure 3:
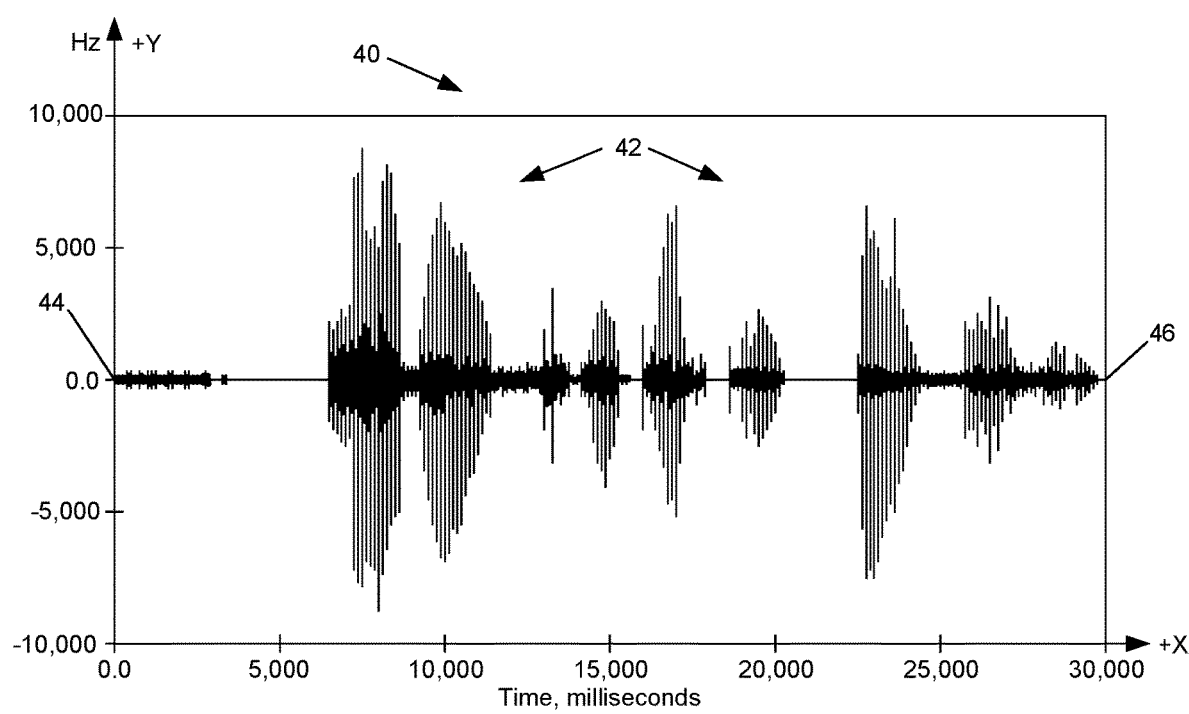
FIG. 3 is a diagram illustrating an example audio signal captured by the electronic device while a user spoke a phrase.

FIG. 3 is a diagram 40 illustrating an example audio signal 42 captured by the electronic device 10 while a user spoke a phrase. The audio signal 42 may be captured by the electronic device 10 while it is operated by the user or another person. The audio signal 42 is audio data that represents captured voice biometric data of the user. The audio signal 42 may be stored in the data record of the user associated with the electronic device 10. The audio signal 42 and a template generated therefrom may be referred to as record audio data or record voice biometric data.

The audio signal 42 is plotted on a Cartesian coordinate system having X and Y-axes. The audio signal 42 extends from the origin 44 to a terminus 46 and has a duration of about three (3) seconds. The duration of the audio signal 42 depends on the length of the spoken phrase which may also vary. Frequency is measured along the Y-axis in Hertz.

The audio signal 42 illustrates the frequency spectrum of the user's speech. The frequency spectrum includes frequencies that vary, for example, between about 9,000 Hz to about negative 9,000 Hz over the duration of the audio signal 42. Moreover, the audio signal illustrates other characteristics of speech. For example, the audio signal 42 includes pauses from about 4,000 milliseconds (ms) to about 6,000 ms and from about 20,000 ms to about 22,500 ms.

Generally, a phrase spoken by a user can be referred to as an utterance. Example phrases include but are not limited to, "My voice is my password, verify me" and "I have several busy children, verify me." Alternatively, a phrase may be a single letter or number, a group of letters or numbers, any combination of letters and numbers, or one or more sentences. Any phrase may be spoken to generate the audio signal 42.

A result may be generated for each authentication transaction that determines the likelihood that voice biometric data provided during the transaction is synthetic. The result is generated by analyzing any combination of speech characteristics described herein. For example, any combination of the pitch, power, intensity, timbre, resonators, coloring and the pace, rhythm, and nature of voice biometric data may be analyzed to determine whether the voice biometric data is authentic or synthetic. The results, for example, confirmed instances of synthetic speech, may be used for retraining the machine learning model to enhance the model's robustness and accuracy over time. Typically, the results are generated and analyzed automatically by the electronic device 10. However, when, for example, a result is not conclusive manual review may be conducted to provide a more conclusive result.

It is contemplated by the present disclosure that the machine learning model may be retrained using captured voice biometric data. Retraining facilitates incorporating new developments in synthetic speech technology over time. By virtue of collecting voice biometric data of users over time, any changes in synthetic speech technology will automatically be accounted for during retraining. The additional training enhances the machine learning model's effectiveness in detecting the most recently developed synthetic speech technology to thus enhance the accuracy and trustworthiness of generated results. The additional training may be periodic, for example, every month or two. Alternatively, the training may be more frequent, for example, once a day or once a week.

A risk score may be calculated for each authentication transaction based on an analysis of any combination of speech characteristics described herein. A user's historical interaction data including, but not limited to, previous security incidents may be used for calculating the risk score. The risk score may be used to determine a risk level for an authentication transaction and to determine an alert corresponding to the risk level.

FIG. 4 is a diagram 48 illustrating example risk scores 50 and corresponding example risk levels 52. More specifically, the risk scores 50 are divided into three ranges, 0.00 to 0.33, 0.34 to 0.66, and 0.67 to 1.00. There are three example risk levels 52, low, medium and high. Risk levels 52 are categorical representations of potential security threat severity as determined by the risk score 50. Each risk level is associated with a range of risk scores and reflects the urgency and potential impact of the perceived security threat. The low, medium, and high risk levels correspond to the risk score ranges of 0.00 to 0.33, 0.34 to 0.66, and 0.67 to 1.00, respectively.

It is contemplated by the present disclosure that the risk scores may be divided into any number of different ranges, and that the ranges may be different than described herein. Moreover, the risk levels may be the same or different and can be designed to correspond to any change in the risk score changes. A same risk level may correspond to different risk scores and/or risk score ranges.

Risk scores ranging from 0.00 to 0.33 typically indicate that the captured voice biometric data is authentic. As a result, captured voice biometric data having a risk score between 0.00 and 0.33 is considered to have a low risk of being synthetic. A low risk level 52 can indicate, for example, that there may be minor discrepancies or anomalies in captured voice biometric data that does not warrant a manual or automatic review. The data may be stored for training the machine learning model.

Risk scores ranging from 0.34 to 0.66 may be assigned to captured voice biometric data having a medium risk of being synthetic. The medium risk level 52 indicates that unusual patterns detected in captured voice biometric data do not necessarily represent synthetic speech but exhibit atypical characteristics that cause it to be outside of standard automated processing criteria. Captured voice biometric data assigned a medium risk level 52 may require, for example, a more thorough automated review or a low priority manual review to confirm the authenticity of the captured voice biometric data.

Risk scores ranging from 0.67 to 1.00 may be assigned to captured voice biometric data having a high risk of being synthetic. A high risk level 52 typically indicates that there is strong possibility that the captured voice biometric data may be synthetic. Captured voice biometric data assigned a high risk level 52 may require initiating automatic security protocols such as, but not limited to, blocking a transaction desired to be conducted by a user, alerting security personal, and identifying an account for further investigation. Further investigation may include determining where, when and by whom the captured voice biometric data was made.

Alerts based on the risk level 52 may be generated for voice biometric data captured during, for example, an authentication transaction.

FIG. 5 is a diagram 54 illustrating the correspondence between risk levels 52 and example alerts 56. There are three alerts 56, each corresponding to a different risk level 52. Alerts 56 are generated based on the corresponding risk level range. An alert 56 indicates that voice biometric data captured during an authentication transaction or other data associated with the transaction requires attention or intervention. The type and severity of alert 56 correlates with the risk level 52.

For low risk levels 52 an alert 56 is not issued. Rather, the event may be stored for use in retraining the machine learning model. For medium levels of risk, an alert 56 may be issued that instructs the electronic device 10 to automatically conduct a more detailed analysis of the captured voice biometric data or indicates that security personnel are to conduct a low level manual review of the captured voice biometric data. A more detailed analysis may include analyzing different characteristics or different combinations of characteristics of the voice biometric data.

A high risk level 52 typically indicates that there is a strong possibility that the captured voice audio data is synthetic. Thus, for high risk levels 52, an alert 56 is issued that may require immediately initiating automatic security protocols such as, but not limited to, temporarily suspending a transaction desired to be conducted by a user, conducting a manual review of the captured voice audio data, automatically starting security protocols, and identifying the data for further investigation. Further investigation may include determining where, when and by whom the captured voice audio data was made.

Alerts may be issued, for example, by displaying a message, emitting a noise, speaking a warning, vibrating, or any combination thereof. The alert may be implemented by the electronic device 10 or any other electronic device or computer in the system 100.

It should be understood that many alerts may be pending simultaneously. By virtue of prioritizing the alerts 56 according to risk level, the higher risk authentication transactions are facilitated to be resolved quickly while lower risk transactions are monitored and/or reviewed according to their severity. Thus, an efficient allocation of security resources is facilitated to be enhanced.

The electronic device 10 may dynamically adjust the relationship between risk scores 50, risk levels 52 and alerts 56 based on retraining the machine learning model. As the model is retrained with additional data, new patterns may be recognized which causes the electronic device 10 to refine the risk scores 50, adjust thresholds defining the risk levels 52, and adjust the alerts 56 accordingly. Additionally, or alternatively, the correspondence between the alerts 56 and the risk levels 52 may be updated based on an analysis of data in the memory 18. Such data includes, but is not limited to, captured voice biometric data and the results of voice biometric data analyses.

The development of artificial intelligence and machine learning technologies has enabled developing synthetic speech technologies capable of generating synthetic speech that can be difficult to distinguish from genuine human speech. Such synthetically generated speech may mimic the intonation, rhythm, and emotional nuances of genuine human speech. As a result, synthetic speech may be a threat to security systems that use voice data to authenticate or verify the identities of people. More specifically, synthetic speech may increase the risks of successfully perpetuating identity fraud on people and institutions, increase the risk of unauthorized access to confidential information stored on computer systems as well as the computer systems themselves, and increase the risks that misinformation campaigns will be successful amongst other things.

Known security systems, including conventional voice watchlist systems, may be designed to detect known security threats based on historical data or predefined criteria. However, such security systems have been known to fail to identify synthetic speech, particularly synthetic speech designed to emulate specific emotional or behavioral patterns exhibited by people. Known security systems typically analyze voice data in isolation without considering nuances in the voice data such as the underlying emotional context or subtle variances that may indicate speech is synthetic. Consequently, there is a need for more advanced detection mechanisms that can detect these nuances and adapt to the evolving sophistication of synthetic speech technologies.

To address these problems the electronic device 10 may receive voice biometric data of a user captured while the user was speaking and analyze the context in which the received voice data was captured. The electronic device 10 may analyze characteristics of the received voice biometric data for anomalies associated with synthetic speech and generate a risk score based on the results of the analysis. The risk score can be compared against a threshold score and in response to determining the risk score fails to satisfy the threshold score, the electronic device can determine that the received voice biometric data includes anomalies associated with synthetic speech and initiate an alert protocol.

Figure 6:
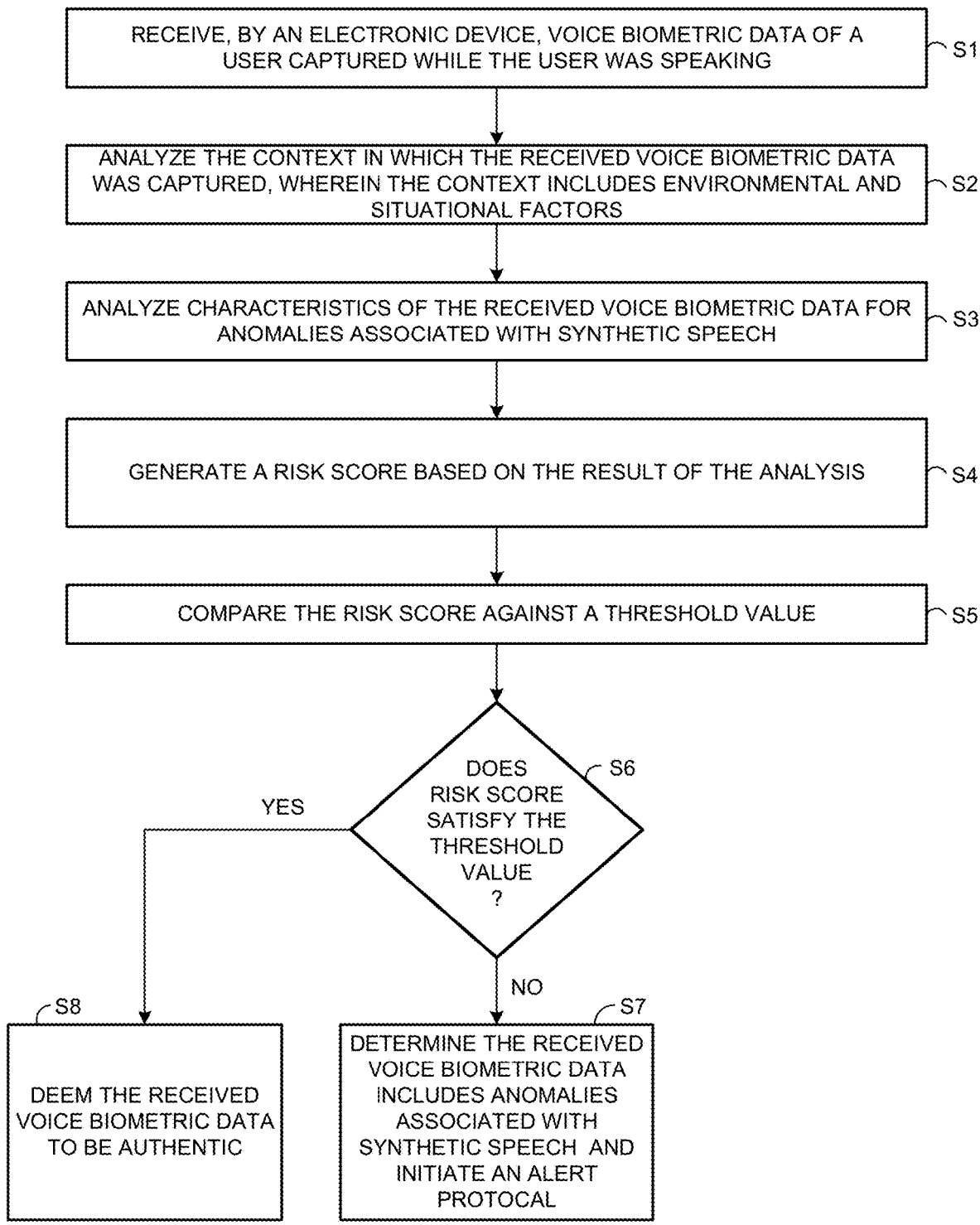
FIG. 6 is a diagram illustrating an example method and algorithm for enhancing detection of synthetic speech according to an embodiment of the present disclosure.

FIG. 6 is a diagram illustrating an example method and algorithm for enhancing detection of synthetic speech according to an embodiment of the present disclosure. A user may be required to authenticate his or her identity before being permitted to conduct, using the electronic device 10, a desired network-based transaction. Such network-based transactions include, but are not limited to, buying merchandise from a merchant service provider website, accessing top secret information from a computer system, or opening an account at a financial institution. Detecting synthetic speech would facilitate reducing fraud and related inconvenience and costs. FIG. 6 illustrates example steps performed when the electronic device 10 runs software 38 stored in the memory 18 to enhance detection of synthetic speech.

In step S1, the software 38 executed by the processor 16 causes the electronic device 10 to receive voice biometric data of a user while the user was speaking. The voice biometric data may be captured during, for example, an authentication transaction. In step S2, the software 38 executed by the processor 16 causes the electronic device 10 to analyze the context in which the voice biometric data was captured. The context can include environmental and situational factors. Examples of environmental factors include, but are not limited to, noise. Examples of situational factors include, but are not limited to, whether the user is under duress and whether the user is excited while at the Super Bowl.

Next, in step S3, the software 38 executed by the processor 16 causes the electronic device 10 to analyze characteristics of the captured voice biometric data for anomalies associated with synthetic speech. Characteristics of the captured voice biometric data include, but are not limited to, the range of pitch, timbre, intensity or loudness, voice resonators, pace, prosody, rhythm, nature of speech and frequency.

Anomalies may be present in each characteristic that may be associated with synthetic speech. For example, for the range of pitch an anomaly may be that the captured voice biometric data has a narrower range of pitch than typically included in authentic speech. For timbre, anomalies can include, but are not limited to, a lack of expected complexity, unusual harmonic structures, and erratic formant movements. For intensity or loudness, an anomaly may be variations in volume that do not correspond with an expressed or expected emotion. For voice resonators, an anomaly may be less variability and responsiveness. For pace, an anomaly may be unnatural timing patterns like a consistent speech rate or abnormal pauses. For prosody, anomalies can include inconsistencies in stress patterns or intonation curves unusual for the context or language norm. For rhythm, anomalies can include unusual pauses or changes in the rhythm of speech such as hesitations or rushed sequences. For natural speech, anomalies can include, but are not limited to, a lack of natural pitch variation across sentences, an unexpected pitch contour within a phrase, unusually long or short durations, or a lack of variability in durations. For frequency, an anomaly can be that the frequency does not exceed a threshold established for synthetic speech, for example, up to 5,354 Hz.

In step S4, the software 38 executed by the processor 16 causes the electronic device 10 to generate a risk score based on the result of the analysis. The risk score may be calculated for each authentication transaction based on an analysis of any combination of the characteristics described herein. A user's historical interaction data including, but not limited to, previous security incidents may be used for calculating the risk score. The risk score may be used to determine a risk level for an authentication transaction and to determine an alert corresponding to the risk level.

Risk scores ranging from 0.00 to 0.33 typically indicate that the captured voice biometric data is authentic. As a result, captured voice biometric data having a risk score between 0.00 and 0.33 is considered to have a low risk of being synthetic. A low risk level 52 can indicate, for example, that there may be minor discrepancies or anomalies in captured voice biometric data that does not warrant a manual or automatic review. The data may be stored for training the machine learning model.

Risk scores ranging from 0.34 to 0.66 may be assigned to captured voice biometric data having a medium risk of being synthetic. The medium risk level 52 indicates that unusual patterns detected in captured voice biometric data do not necessarily represent synthetic speech but exhibit atypical characteristics that cause it to be outside of standard automated processing criteria. Captured voice biometric data assigned a medium risk level 52 may require, for example, a more thorough automated review or a low priority manual review to confirm the authenticity of the captured voice biometric data.

Risk scores ranging from 0.67 to 1.00 may be assigned to captured voice biometric data having a high risk of being synthetic. A high risk level 52 typically indicates that there is strong possibility that the captured voice biometric data may be synthetic. Captured voice biometric data assigned a high risk level 52 may require initiating automatic security protocols such as, but not limited to, blocking a transaction desired to be conducted by a user, alerting security personal, and identifying an account for further investigation. Further investigation may include determining where, when and by whom the captured voice biometric data was made.

In step S5, the software 38 executed by the processor 16 causes the electronic device 10 to compare the risk score against a threshold value, and in step S6 to determine whether the risk score satisfies the threshold value. The risk score may satisfy the threshold value when the risk score is equal to or greater than the threshold value, greater than the threshold value, less than the threshold value, or less than or equal to the threshold value. The threshold value may alternatively include multiple threshold values, each of which is required to be satisfied by a respective risk score to satisfy the threshold value. The threshold value may be dynamically adjusted based on historical data trends, anomaly detection accuracy, and user feedback.

When the risk score fails to satisfy the threshold value, in step S7, the software 38 executed by the processor 16 causes the electronic device 10 to deem the voice audio data is fraudulent and to generate an alert 56 having a risk level corresponding to the risk score. Issuing an alert includes, but is not limited to, displaying a message, emitting a noise, speaking a warning, vibrating or any combination thereof. The alert may be implemented by the electronic device 10 or any other electronic device or computer in the system 100.

However, when the risk score satisfies the threshold value, in step S8, the software 38 executed by the processor 16 causes the electronic device 10 to deem the voice audio data authentic.

Although the risk score is compared against the threshold value in the example method and algorithm, in other embodiments the risk score may not be compared against the threshold value. Instead, the risk level 52 corresponding to the risk score may be used to determine whether the captured voice biometric data is authentic. For example, a low risk level may indicate that the captured voice biometric data is authentic. A medium risk level 52 may indicate that the authenticity of the captured voice biometric data is uncertain. As a result, the software 38 executed by the processor 16 causes the electronic device 10 to issue an alert indicating that a low priority manual review is required to determine whether the captured biometric data is authentic.

A high risk level 52 may indicate that the captured voice biometric data is synthetic. In response to determining the risk level 52 is high, the software 38 executed by the processor 16 can cause the electronic device 10 to issue a high priority alert 56. Issuing a high priority alert includes, but is not limited to, displaying a message, emitting a noise, speaking a warning, vibrating or any combination thereof indicating the voice biometric data is synthetic.

Using the methods and algorithms for enhancing detection of synthetic speech as described herein enables quickly determining whether voice biometric data may be synthetic speech by detecting the underlying emotional context and subtle variances in voice biometric data using a machine learning model capable of adapting to the nuanced and evolving nature of synthetic speech generation technologies. As a result, the methods and algorithms facilitate enhancing a reduction in risks associated with conducting different kinds of network-based transactions while enhancing security against spoofing attacks and facilitating a reduction in costs incurred due to successful spoofing attacks as well as the inconvenience experienced by users that are victims of successful spoofing attacks.

It is contemplated by the present disclosure that the example methods and algorithms described herein may be implemented as one or more machine learning models that may be periodically retrained with data captured during, for example, authentication transactions of the same or different users. Doing so facilitates adapting the example methods and algorithms described herein to evolving synthetic speech generation techniques which further facilitates the reduction of risks associated with conducting network-based transactions. The machine learning models may be retrained after any period of time, for example, every three to six months.

It is contemplated by the present disclosure that the example methods and algorithms described herein may be conducted entirely by the electronic device 10; partly by the electronic device 10 and partly by the server 12; entirely by the server 12, or by any other combination of other servers (not shown), electronic devices (not shown), or computers (not shown) operable to communicate with the electronic device 10 and the server 12 via the network 14. Furthermore, data described herein as being stored in the electronic device 10 may alternatively, or additionally, be stored in the server 12 or any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. For any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for enhancing detection of synthetic speech comprising the steps of:
    receiving, by an electronic device, voice biometric data of a user captured while the user was speaking;
    analyzing the context in which the received voice biometric data was captured, wherein the context includes environmental and situational factors;
    analyzing characteristics of the received voice biometric data for anomalies associated with synthetic speech, wherein the anomalies include a lack of variability in duration;
    generating a risk score based on the results of the context analysis and the characteristics analysis;
    comparing the risk score against a threshold value; and
    in response to determining the risk score fails to satisfy the threshold score, determining the captured voice biometric data includes anomalies associated with synthetic speech and initiating an alert protocol.

2. The method according to claim 1, wherein the alert protocol comprises:
    manually reviewing the received voice biometric data; and
    categorizing the received voice biometric data as potentially synthetic speech based on the risk score.

3. The method according to claim 1, wherein the characteristics comprise:
    range of pitch;
    timbre;
    intensity;
    prosody; and
    pace, rhythm, and nature of speech.

4. The method according to claim 1, wherein the anomalies comprise:
- a narrow range of pitch;
- a lack of expected complexity, unusual harmonic structures, and erratic formant movements;
- variations in loudness not corresponding with an expressed or expected emotion;
- consistent speech rate;
- abnormal pauses;
- inconsistencies in stress patterns;
- intonation curves unusual for the context;
- hesitations or rushed speech;
- lack of natural pitch variation across sentences;
- an unexpected pitch contour within a phrase; and
- unusually long or short durations.

5. The method according to claim 1, further comprising:
- determining a frequency range for synthetic speech and a frequency range for genuine speech;
- determining the frequency range of the received voice biometric data;
- determining whether the received voice biometric data frequency range is within the synthetic or genuine frequency ranges;
- in response to determining the received voice biometric data frequency range is within the synthetic frequency range, subjecting the received voice biometric data to additional review; and
- in response to determining the received voice biometric data frequency range is within the genuine frequency range, determining the received voice biometric data is genuine.

6. The method according to claim 5, said determining steps comprising operating, by the electronic device, a machine learning model trained to recognize and differentiate between synthetic and genuine speech.

7. The method according to claim 6, further comprising updating the machine learning model using data from authentication transactions to enhance the accuracy of the model in recognizing and differentiating between synthetic and genuine speech.

8. An electronic device for enhancing detection of synthetic speech comprising:
- a processor; and
- a memory configured to store data, said electronic device being associated with a network and said memory being in communication with said processor and having instructions stored thereon which, when read and executed by said processor, cause said electronic device to:
- receive voice biometric data of a user captured while the user was speaking;
- analyze the context in which the received voice biometric data was captured, wherein the context includes environmental and situational factors;
- analyze characteristics of the received voice biometric data for anomalies associated with synthetic speech, wherein the anomalies include a lack of variability in duration;
- generate a risk score based on the results of the context analysis and the analysis of the received voice biometric data for anomalies associated with synthetic speech;
- compare the risk score against a threshold value; and
- in response to determining the risk score fails to satisfy the threshold score, determine the received voice biometric data includes anomalies associated with synthetic speech and initiating an alert protocol.

9. The electronic device according to claim 8, wherein the instructions when read and executed by said processor, cause said electronic device to:
- prompt a manual review of the received voice biometric data; and
- categorize the received voice biometric data as potentially synthetic based on the risk score.

10. The electronic device according to claim 8, wherein the characteristics comprise:
- range of pitch;
- timbre;
- intensity;
- prosody; and
- pace, rhythm, and nature of speech.

11. The electronic device according to claim 8, wherein the anomalies comprise:
- a narrow range of pitch;
- a lack of expected complexity, unusual harmonic structures, and erratic formant movements;
- variations in loudness not corresponding with an expressed or expected emotion;
- consistent speech rate;
- abnormal pauses;
- inconsistencies in stress patterns;
- intonation curves unusual for the context;
- hesitations or rushed speech;
- lack of natural pitch variation across sentences;
- an unexpected pitch contour within a phrase; and
- unusually long or short durations.

12. The electronic device according to claim 8, wherein the instructions when read and executed by said processor, cause said electronic device to:
- determine a frequency range for synthetic speech and a frequency range for genuine speech;
- determine the frequency range of the received voice biometric data;
- determine whether the received voice biometric data frequency range is within the synthetic or genuine frequency ranges;
- in response to determining the received voice biometric data frequency range is within the synthetic frequency range, subject the received voice biometric data to additional review; and
- in response to determining the received voice biometric data frequency range is within the genuine frequency range, determine the received voice biometric data is genuine.

13. The electronic device according to claim 8, wherein the instructions when read and executed by said processor, cause said electronic device to operate a machine learning model trained to recognize and differentiate between synthetic and genuine speech.

14. The electronic device according to claim 13, wherein the instructions when read and executed by said processor, cause said electronic device to update the machine learning model using data from authentication transactions to enhance the accuracy of the model in recognizing and differentiating between synthetic and genuine speech.

15. A non-transitory computer-readable recording medium in an electronic device for authenticating users, the non-transitory computer-readable recording medium storing instructions which when executed by a hardware processor cause the non-transitory recording medium to perform steps comprising:
- receiving voice biometric data of a user captured while the user was speaking;

analyzing the context in which the received voice biometric data was captured, wherein the context includes environmental and situational factors;

analyzing characteristics of the received voice biometric data for anomalies associated with synthetic speech, wherein the anomalies include a lack of variability in duration;

generating a risk score based on the results of the context analysis and the characteristics analysis;

comparing the risk score against a threshold value; and in response to determining the risk score fails to satisfy the threshold score, determining the captured voice biometric data includes anomalies associated with synthetic speech and initiating an alert protocol.

16. The non-transitory computer-readable recording medium according to claim 15, wherein the instructions when read and executed by said processor, further cause said non-transitory computer-readable recording medium to perform a step comprising operating a machine trained model trained to recognize and differentiate between synthetic and genuine speech.

17. The non-transitory computer-readable recording medium according to claim 15, wherein the instructions when read and executed by said processor, further cause said non-transitory computer-readable recording medium to perform the steps of:

determining a frequency range for synthetic speech and a frequency range for genuine speech;

determining the frequency range of the received voice biometric data;

determining whether the received voice biometric data frequency range is within the synthetic or genuine frequency ranges;

in response to determining the received voice biometric data frequency range is within the synthetic frequency range, subjecting the received voice biometric data to additional review; and in response to determining the received voice biometric data frequency range is within the genuine frequency range, determining the received voice biometric data is genuine.

* * * * *